(12) United States Patent
Galvin et al.

(10) Patent No.: US 7,441,667 B2
(45) Date of Patent: Oct. 28, 2008

(54) COMPOSITE MEMBRANES FOR LIQUID FILTRATION HAVING IMPROVED UNIFORMITY AND ADHESION OF SUBSTRATE TO MEMBRANE

(75) Inventors: Jennifer Marie Galvin, Nashville, TN (US); Henricus Jacobus Cornelis Gommeren, Hockessin, DE (US); Rachel Elizabeth Montejo, Parramatta (AU); Tina Amick Waller, Old Hickory, TN (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 397 days.

(21) Appl. No.: 11/304,344

(22) Filed: Dec. 15, 2005

(65) Prior Publication Data

US 2007/0138084 A1    Jun. 21, 2007

(51) Int. Cl.
| | |
|---|---|
| *B01D 67/00* | (2006.01) |
| *B01D 69/06* | (2006.01) |
| *B05D 5/00* | (2006.01) |
| B01D 61/00 | (2006.01) |
| B01D 71/00 | (2006.01) |

(52) U.S. Cl. ............... 210/507; 210/500.1; 210/500.21; 96/4; 427/245

(58) Field of Classification Search .................. None
See application file for complete search history.

(56) References Cited

U.S. PATENT DOCUMENTS

| | | | |
|---|---|---|---|
| 4,645,602 A | 2/1987 | Barnes, Jr. et al. |
| 4,728,394 A | 3/1988 | Shinjou et al. |
| 4,795,559 A | 1/1989 | Shinjou et al. |
| 5,275,725 A | 1/1994 | Ishii et al. |
| 5,433,859 A | 7/1995 | Degen |
| 5,435,957 A | 7/1995 | Degen et al. |
| 5,458,719 A | 10/1995 | Pall et al. |
| 5,500,167 A | 3/1996 | Degen |
| 5,851,355 A | 12/1998 | Goettmann |
| 5,989,432 A | 11/1999 | Gildersleeve et al. |
| 6,090,441 A | 7/2000 | Vining, Jr. et al. |
| 6,264,044 B1 | 7/2001 | Meyering et al. |
| 6,293,411 B1 | 9/2001 | Beer |
| 6,413,070 B1 | 7/2002 | Meyering et al. |
| 2002/0030009 A1 | 3/2002 | Lin |
| 2004/0045892 A1 | 3/2004 | De La Cruz |
| 2005/0006301 A1 | 1/2005 | Angelini et al. |

FOREIGN PATENT DOCUMENTS

| | | |
|---|---|---|
| EP | 0 645 487 A1 | 3/1995 |
| EP | 1 044 719 A1 | 10/2000 |
| EP | 0 980 700 B1 | 10/2005 |
| WO | WO 96/09879 | 4/1996 |

OTHER PUBLICATIONS

Richard Baker, "Solution Coated Composite Membrane", Membrane Technology & Applications, 2nd Edition, 2004, pp. 119-122.

*Primary Examiner*—Krishnan S Menon

(57) ABSTRACT

An improved casting substrate is provided for use in a composite membrane for use as a fluid filtration medium. The composite membrane has good adhesion between the casting substrate and the microporous membrane while maintaining high permeability. The casting substrate comprises a single spunbond layer or a multiple spunbond layers formed of thermoplastic fibers, optionally comprising at least one meltblown layer. The casting substrate allows the membrane casting solution to penetrate the casting substrate uniformly to a controlled depth without penetrating through the entire thickness of the substrate. The casting substrate has good uniformity of mean pore size, basis weight, thickness and surface roughness.

23 Claims, No Drawings

COMPOSITE MEMBRANES FOR LIQUID FILTRATION HAVING IMPROVED UNIFORMITY AND ADHESION OF SUBSTRATE TO MEMBRANE

BACKGROUND OF THE INVENTION

1. Field of the Invention

The invention relates to composite membranes that are formed by casting a polymeric solution onto a porous nonwoven substrate thereby forming a composite of a microporous membrane layer and a support layer. The composite membranes are especially suited for use in fluid filtration, including the filtration of liquids and gases.

2. Description of the Related Art

The filtration of liquids includes the general categories of "microfiltration," in which particulate matter in the range of about 0.1 μm to about 10 μm in diameter is filtered from the liquid, "ultrafiltration," in which matter in the range of about 50 nm to about 0.5 μm in diameter is filtered, and reverse osmosis in which matter in the range of about 1 Å to about 1 nm in diameter is filtered. Microfiltration, ultrafiltration and reverse osmosis each utilize a polymeric microporous membrane as the filtration medium, either used alone or in conjunction with a support layer. When used in conjunction with a support layer, a composite membrane is formed. The support layer provides the mechanical integrity of the composite membrane by virtue of its strength and stiffness, without reducing the permeability of the composite membrane. The support layer is a substrate onto which the polymeric solution forming the microporous membrane is cast and solidified, thus forming the composite membrane. In the case of ultrafiltration, the filtration membrane is typically cast onto a polypropylene or polyethylene substrate. In the case of reverse osmosis membranes, the microporous membrane is typically cast onto a polyester substrate.

The performance of composite membranes is negatively impacted by a number of deficiencies encountered with currently available composite membranes. For one, the composite membrane can delaminate due to poor adhesion between the microporous membrane and the support layer, which in turn may be attributed to poor affinity of the microporous membrane for the support layer or poor mechanical interlocking at the interface of the support layer and the microporous membrane. When the liquid membrane-forming polymeric solution is first cast onto the support layer, the solution penetrates beyond the surface of the support layer and subsequently solidifies around the fibers at and near the surface of the support layer, providing mechanical interlocking between the microporous membrane and the support layer. Delamination of the microporous membrane and the support layer during use of the composite membrane results in non-uniformity of the composite membrane and compromised filtration performance.

Another problem encountered with conventional composite membranes is small discontinuities in the microporous membrane or "pin holes" caused by defects in the surface of the casting substrates such as individual raised or standing fibers. By "raised fibers" is meant free ends or raised loops of fibers of the substrate that stand out of the plane of the substrate surface. Raised fibers break the continuity of the surface of the substrate, such that it is difficult or impossible to cast a continuous, uniform membrane.

Another problem which has been encountered with conventional composite membranes during the casting process is "strikethrough" of the membrane polymer solution, in which the polymer solution passes through the thickness of the substrate, resulting in nonuniform permeability and filtration efficiency. Strikethrough occurs in substrates at areas having high permeability due to large pores and/or increased number of pores (resulting in high porosity). Large pores often occur in nonwoven substrates having coarse or large diameter fibers. Conversely, the use of substrates having low permeability due to very fine fibers and small mean pore sizes on the surface thereof may result in insufficient penetration of the membrane solution, or in insufficient filtration capacity of the composite membrane.

Another problem encountered in conventional composite membranes is a high degree of variability of the thickness of the substrate which results in variability in the thickness of the microporous membrane which is cast thereon, again resulting in nonuniform performance of the composite membrane.

U.S. Pat. Nos. 4,728,394 and 4,795,559 disclose a nonwoven support layer for casting semipermeable membranes thereon, comprising a laminate of a low density layer made entirely from air-laid or carded polyester fibers containing 20 to 80 % undrawn polyester or bicomponent polyester fibers, and a high density layer.

U.S. Pat. No. 5,989,432 discloses a composite membrane including a semipermeable membrane, a support layer and a nonwoven web of multicomponent fibers therebetween wherein the multicomponent fibers comprise a first polymer as the core component and a second polymer on the surface of the fibers, the second polymer having a softening temperature below the softening temperatures of the first polymer, the membrane and the support layer.

U.S. Patent Publication No. 2004/0045892 A discloses an asymmetric nonwoven support layer having a microporous casting layer having a mean pore size no greater than about 300 μm on the surface thereof for casting semipermeable membranes, the casting layer formed by heat treating, calendering, melt-blowing or wet-laying a layer of fibers.

There is a need for an improved substrate onto which a microporous membrane is cast for forming composite membranes, the substrate having improved pore size uniformity and surface smoothness such that a membrane of uniform, controllable thickness and substantially free of pin holes is formed when cast thereon. It would also be desirable to have an improved substrate that would provide improved adherence of the microporous membrane to the substrate.

SUMMARY OF THE INVENTION

One embodiment of the present invention is directed to a casting substrate for casting a microporous membrane thereon and supporting the microporous membrane in a composite membrane, the casting substrate having a casting surface comprising a porous spunbond layer having a casting surface substantially free of raised fibers and loops and a bottom surface and having a pore size gradient through the thickness thereof, wherein the casting surface has a mean pore size of between about 15 μm and about 200 μm and the bottom surface has a mean pore size of between about 1 μm and about 20 μm.

Another embodiment of present invention is directed to a casting substrate for casting a microporous membrane thereon and supporting the microporous membrane in a composite membrane, the casting substrate having a casting surface substantially free of raised fibers and loops comprising a first porous spunbond layer having a casting surface laminated to a second porous spunbond layer, wherein the mean pore size of the first porous spunbond layer is between about 10 μm and about 200 μm and the mean pore size of the second porous spunbond layer is between about 1 μm and about 20 μm.

Another embodiment of the present invention is directed to a composite membrane comprising a microporous membrane layer and a casting substrate according to the present invention wherein the composite membrane is a liquid or gas filtration medium.

Yet another embodiment of the present invention is directed to a process for forming a composite membrane comprising a microporous membrane layer and a casting substrate, comprising the steps of providing a porous spunbond fabric comprising polymeric fibers having a casting surface and a bottom surface, wherein the fabric has a pore size gradient between the casting surface and the bottom surface; and casting a polymeric solution onto the casting surface of the spunbond fabric to form the microporous membrane layer.

Definitions

The term "microporous membrane" as used herein refers to a thin microporous layer useful as a filtration medium in liquid filtration. The term "microporous membrane" as used herein is understood to encompass both a thin microporous layer useful as a filtration medium in liquid filtration and a thin film comprising a thin microporous layer coated with a nonporous film useful as a diffusion membrane.

The term "composite membrane" as used herein refers to a support layer and a microporous membrane cast onto the surface of the support layer.

The terms "substrate" and "support layer" as used herein are used interchangeably to refer to the nonwoven onto which a microporous membrane is cast to form a composite membrane.

The term "polyethylene" (PE) as used herein is intended to encompass not only homopolymers of ethylene, but also copolymers wherein at least 85% of the recurring units are ethylene units, and includes "linear low density polyethylenes" (LLDPE) which are linear ethylene/α-olefin copolymers having a density of less than about 0.955 g/cm$^3$, and "high density polyethylenes" (HDPE), which are polyethylene homopolymers having a density of at least about 0.94 g/cm$^3$.

The term "polyester" as used herein is intended to embrace polymers wherein at least 85% of the recurring units are condensation products of dicarboxylic acids and dihydroxy alcohols with linkages created by formation of ester units. Examples of polyesters include poly(ethylene terephthalate) (PET), which is a condensation product of ethylene glycol and terephthalic acid, and poly(1,3-propylene terephthalate), which is a condensation product of 1,3-propanediol and terephthalic acid.

The term "copolyester" as used herein is intended to embrace block, graft, random and alternating polyester copolymers.

The terms "nonwoven fabric", "nonwoven sheet", "nonwoven layer", and "nonwoven web" as used herein refer to a structure of individual fibers, filaments, or threads that are positioned in a random manner to form a planar material without an identifiable pattern, as opposed to a knitted or woven fabric. Examples of nonwoven fabrics include meltblown webs, spunbond webs, and composite sheets comprising more than one nonwoven web.

The term "machine direction" (MD) is used herein to refer to the direction in which a nonwoven web is produced (e.g. the direction of travel of the supporting surface upon which the fibers are laid down during formation of the nonwoven web). The term "cross direction" (XD) refers to the direction generally perpendicular to the machine direction in the plane of the web.

The term "spunbond fibers" as used herein means fibers that are melt-spun by extruding substantially continuous molten thermoplastic polymer material as fibers from a plurality of fine, usually circular, capillaries of a spinneret with the diameter of the extruded fibers then being rapidly reduced by drawing and then quenching the fibers.

The term "meltblown fibers" as used herein, means fibers that are melt-spun by meltblowing, which comprises extruding a melt-processable polymer through a plurality of capillaries as molten streams into a high velocity gas (e.g. air) stream.

The term "spunbond-meltblown-spunbond nonwoven fabric" (SMS) as used herein refers to a multilayer composite sheet comprising a web of meltblown fibers sandwiched between and bonded to two spunbond layers. Additional spunbond and/or meltblown layers can be incorporated in the composite sheet, for example spunbond-meltblown-meltblown-spunbond webs (SMMS), etc.

The term "multiple component fiber" as used herein refers to a fiber that is composed of at least two distinct polymeric components that have been spun together to form a single fiber. The at least two polymeric components are arranged in distinct, substantially constantly positioned zones across the cross-section of the multiple component fibers, the zones extending substantially continuously along the length of the fibers.

The term "bicomponent fiber" is used herein to refer to a multiple component fiber that is made from two distinct polymer components, such as sheath-core fibers that comprise a first polymeric component forming the sheath, and a second polymeric component forming the core; and side-by-side fibers, in which the first polymeric component forms at least one segment that is adjacent at least one segment formed of the second polymeric component, each segment being substantially continuous along the length of the fiber with both polymeric components being exposed on the fiber surface. Multiple component fibers are distinguished from fibers that are extruded from a single homogeneous or heterogeneous blend of polymeric materials. The term "multiple component nonwoven web" as used herein refers to a nonwoven web comprising multiple component fibers. A multiple component web can comprise single component and/or polymer blend fibers, in addition to multiple component fibers.

DETAILED DESCRIPTION OF THE INVENTION

The present invention relates to nonwoven sheets for use as substrates in composite membranes suitable for use in fluid filtration, including the filtration of liquids and gases, and composite membranes made by casting a microporous membrane-forming solution onto the surface of the substrate. The substrate of the invention can have one of a few different structures. The substrate can be a spunbond fabric having a pore size gradient through the thickness thereof; the substrate can be a fabric comprising a laminate of two spunbond layers having differing mean pore sizes; the substrate can also be a spunbond-meltblown-spunbond multilayer substrate comprising at least one meltblown layer between two spunbond layers. In each embodiment, the substrate provides a barrier layer such that in use, the membrane casting solution is allowed to pass through the larger pores on the top side of the substrate and penetrate the substrate to a controlled depth.

In one embodiment, the substrate is a spunbond fabric having a pore size gradient through the thickness thereof. The substrate has a casting surface and a bottom surface. The mean pore size is between about 15 µm and about 200 µm on the casting surface and between about 1 µm and about 20 µm on the bottom surface. This structure may be formed by melt spinning fibers onto a moving collection belt in a process having multiple consecutive spinning beams in which the spinning beams differ in terms of spinning conditions such as spinneret hole size and spacing, such that consecutively spun spunbond webs or layers of melt-spun fibers have differing mean pore sizes. The structure may also be formed by melt spinning a spunbond fabric in a single pass of a collection belt beneath a spinning beam and subsequently bonding only one side of the fabric, resulting in a difference in pore size between the two opposite surfaces of the fabric. The depth at which the pore size is reduced acts as a barrier layer which stops the casting solution from penetrating the substrate further.

In another embodiment, the substrate is a fabric comprising a laminate of two spunbond layers (SS) having differing mean pore sizes, a top spunbond layer onto which the solution is cast, and a bottom spunbond layer. In this embodiment, the spunbond layers are laminated together by any known lamination means, such as by the use of an adhesive, thermal calendering, ultrasonic bonding, etc. The casting surface of the top spunbond layer has a mean pore size of between about 10 µm and about 200 µ, while the bottom surface of the bottom spunbond layer has a mean pore size of between about 1 µm and about 20 µm. The spunbond fibers have a diameter between about 10 µm and about 25 µm, advantageously between about 15 µm and about 20 µm. The top spunbond layer can have a larger fiber diameter resulting in a larger mean pore size than the subsequent or bottom spunbond layer. The top spunbond layer permits the casting solution to penetrate, resulting in good adherence of the microporous membrane to the substrate. However, the smaller mean pore size and the narrow pore size distribution of the bottom spunbond layer prevents the solution from penetrating any further, such that the bottom layer acts as a barrier layer controlling the depth of penetration of the membrane solution.

In yet another embodiment of the invention, the substrate is a fabric comprising a spunbond-meltblown-spunbond multilayer structure comprising at least one meltblown layer between two spunbond layers (SMS, SMMS, etc.). In this embodiment, at least one meltblown layer is sandwiched between two separate spunbond layers, and the SMS structure is bonded together by any known means, such as adhesives, thermal calendering, ultrasonic bonding, etc. The casting surface of the top spunbond layer has a mean pore size of between about 10 µm and about 200µ. The fibers of the meltblown layer have diameters between about 0.5 µm and about 10 µm, advantageously between about 2 µm and about 7 µm. The meltblown layer has a mean pore size of between about 1 µm and about 20 µm. The meltblown layer has a narrow pore size distribution, e.g., less than a 20 µm difference between the minimum and maximum pore sizes, advantageously about a 10 µm difference between the minimum and maximum pore sizes. The meltblown layer acts as a barrier layer due to the small mean pore size and pore size distribution and thus determines or controls the depth of penetration of the membrane solution in the substrate. In this embodiment, the greater mean pore size of the spunbond layer allows the solution to penetrate the spunbond layer, thereby improving the adherence of the microporous membrane to the substrate, and the meltblown layer(s) are located to stop the propagation of the membrane solution so that the solution does not penetrate the entire substrate (strikethrough). The mean pore size of the bottom spunbond layer is not critical since it is the meltblown layer that functions as the barrier layer in this embodiment of the invention.

The substrate is formed of any polymeric material having the appropriate properties for the particular application of the resulting composite membrane, e.g., thermal resistance, chemical resistance, biocompatibility and compatibility with post-treatments such as curing and drying. Suitable polymers for use in the invention include polyacrylonitrile, polyvinylidene fluoride, polyvinyl alcohol, polystyrene, polysulfone, polyether sulfone, polycarbonate, polyethylene terephthalate, polyimide, polyethylene, polypropylene, aromatic polyamides, aliphatic polyamides, polyphenylene sulfide and polyvinyl chloride.

The multilayer nonwoven sheet of the invention can be a combination of polyethylene terephthalate (PET) polymer and polyethylene (PE), or a combination of PET and a copolymer of PET (coPET), either as bicomponent fibers or as a blend of fibers. The use of PET/coPET combinations has been found to improve the bonding process of the nonwoven sheet. Using polymers having slightly different melting temperatures allows the retention of the fiber strength of the higher melting polymer component, the PET component, while allowing the lower melting polymer component, the coPET or PE component, to flow in order to create adequate bond points and uniformity. The fibers of the spunbond layers of the multilayer nonwoven sheet can have a sheath-core configuration, in which the lower melting polymer (coPET or PE) is the sheath component and the PET polymer is the core component. When an SMS multilayer nonwoven sheet structure is used, the spunbond layers can have the above described sheath-core configuration while the meltblown layer can be a blend or mixture of higher melting polymer (PET) and lower melting polymer (coPET or PE) fine fibers. Alternatively, when an SMS multilayer nonwoven sheet structure is used, either the spunbond layer or the meltblown layer can comprise bicomponent fibers of PET as the higher melting component, and coPET or PE as the lower melting component, as described above.

The substrate of the invention provides a number of advantages in use compared with incumbent substrates. The substrates have porous fibrous nonwoven surfaces which provide good interlocking with the membrane solution and therefore good adhesion to the microporous membrane layer, reducing the likelihood of delamination. The substrates have uniform thickness and basis weight, which in turn contribute to the thickness uniformity of the composite membranes. The mean pore size and pore size distribution of the substrates are controlled so that the depth of penetration of the casting solution in the substrate is highly uniform, also improving the uniformity of the composite membrane overall. The substrates of the invention also have a smooth surface so that the composite membranes made using the substrates are substantially free of pin holes.

The surface of the substrate onto which the membrane solution is cast is smooth and substantially free of raised fibers and loops. Raised fibers and loops can result in pin holes when the microporous membrane is cast onto the substrate, thereby preventing the formation of a uniform microporous membrane layer. Defects in the microporous membrane can be detected using a bubble point test. In order to achieve a smooth surface, the substrate is calendered by passing it through a calender nip, such as a nip formed by pressing two smooth-surfaced rolls against each other. One of the rolls is generally a heated metal roll and a second (back-up) roll generally has a surface made of a softer material, such as a rubber-coated roll. The second roll is generally unheated and preferably has a Shore D hardness between about 70 and about 100. The hardness of the back-up roll combined with the calender nip pressure determines the size of the nip contact footprint, with softer rolls having the potential for significant deflection that will create a large contact footprint between the rolls. The larger the footprint, the more time the nonwoven web is subjected to the temperature and pressure in the nip and the larger the degree of thermal bonding of the web.

In the embodiments of the present invention in which the substrate is formed from single component fibers, the combined calendering process conditions (roll temperature, nip pressure, and residence time or line speed) used to form the calendered sheets are selected to result in inter-fiber bonding at fiber cross-over points by softening of the polymer without significant flowing caused by melting of the polymer.

In the embodiments of the present invention in which the substrate is formed from multiple component fibers (e.g., bicomponent fibers having a lower-melting polymeric component and a higher-melting polymeric component), the combined calendering process conditions used to form the smooth-calendered sheets of the present invention are selected to cause the lower-melting polymeric component of the multiple component fibers in the web to flow into and partially fill the interstitial spaces between the fibers while the higher-melting polymeric component of the multiple component fibers remain solid. Calendered sheets that have been calendered under conditions that cause significant flow of the lower-melting polymeric component into the interstitial spaces between the fibers such that a continuous or semi-continuous film is formed are referred to herein as heavily calendered sheets, which are distinguished from smooth-calendered sheets that have been calendered under conditions that result primarily in inter-fiber bonding at fiber cross-over points by melting/softening of the lower melting polymeric component without significant flowing of the lower-melting component. In order to achieve the desired degree of polymer flow during calendering, the heated roll temperatures are kept close to the melting point of the lower-melting polymeric component and the residence time in the nip is adjusted by the line speed and nip pressure until the desired amount of polymer flow is obtained. The difference between the temperature of the roll heating medium (e.g. oil, electric, etc.) and the surface temperature of the calender roll is a strong function of the calendering equipment used and care is required to ensure that the rolls are not over- or under-heated.

The calendered sheets of the present invention can be bonded using a variety of calender roll configurations known in the art. In one embodiment of the invention, a nonwoven fabric is passed through a first calender nip, formed by a smooth heated metal roll and a smooth unheated back-up roll to smooth-calender one side of the fabric, and the fabric is then immediately passed through another nip formed by a smooth heated metal roll and an unheated back up roll to smooth calender the opposite side of the fabric. Alternately, nonwoven fabric can be passed through a nip formed by a smooth heated metal roll and a smooth unheated back-up roll to smooth-calender one side of the fabric, in a single pass.

The calendering process can be performed in-line immediately after formation of the nonwoven fabric. Alternately, a pre-formed nonwoven fabric can be calendered in a separate process. The pre-formed nonwoven fabric can be pre-bonded, such as by thermal point bonding prior to being rolled up for calendering in a separate step.

When the multiple component nonwoven fabric comprises one or more meltblown layers, calendering conditions are selected as described above, such that the lower melting component of the spunbond layers melts and flows into the interstitial spaces between the spunbond fibers. The meltblown layer(s) can be a single component meltblown layer or a multiple component meltblown layer. When the meltblown layer is a multiple component layer of meltblown fibers comprising a lower melting component and a higher melting component, the calendering conditions can be selected such that the lower melting meltblown component melts and flows into the interstitial spaces between the meltblown fibers. Alternately, the calendering conditions can be selected such that there is no significant flowing of the lower melting meltblown component.

Calendered sheets formed from spunbond, SS, SMS, or SMMS, etc., fabrics are especially suitable for use as casting substrates for use in forming composite membranes suitable for filtration or separation media that separate matter from liquids or gases. For these uses, the composite membrane includes a microporous membrane and the calendered sheet as the substrate.

The calendered sheet preferably has an trap tear strength measured in both the machine direction and cross direction of between about 0.5 lb (2.2 N) and about 15 lb (67 N), and a Grab strength measured both the machine direction and cross direction of at least about 15 lb (67 N).

In order to form the composite membrane, a polymeric solution is cast by any known method onto the surface of a fibrous nonwoven substrate, thereby forming a composite membrane consisting of a microporous membrane and a substrate. The solvent of the polymeric solution is subsequently removed by evaporation or by extraction in an aqueous bath. Known methods for casting a solution onto a substrate to form a composite membrane are described in Membrane Technology and Applications (second edition) by Richard Baker, Wiley, 2004 (page 119, "Solution Coated Composite Membranes").

The adhesion of the microporous membrane layer to the substrate can be improved by improving the affinity of the membrane solution for the substrate. The affinity of the substrate for the membrane solution can be improved via corona treatment or traditional methods such as padding or spraying with binders or surfactants.

The composite membrane of the present invention is useful in a wide variety of applications such as filtering seawater to yield potable water, providing ultrapure water necessary in food and beverage, pharmaceuticals and biopharmaceuticals processing, and providing pure water for the chemical and pulp and paper industries as well as a variety of other industrial applications including waste treatment, oil emulsion waste treatment, treatment of whey in dairy industries, concentration of biological micromolecules, micro-electronics manufacturing, fermentation, and laboratory/analytical uses. The composite membrane is also useful to remove contaminants from gases including, but not limited to, air, nitrogen, helium, carbon dioxide, oxygen, argon, acetylene, hydrogen, and carbon monoxide.

Test Methods

In the description above and the examples that follow, the following test methods are employed to determine various reported characteristics and properties. ASTM refers to the American Society for Testing and Materials. TAPPI refers to Technical Association of Pulp and Paper Industry.

Basis Weight is a measure of the mass per unit area of a fabric or sheet and is determined by ASTM D-3776, which is hereby incorporated by reference, and is reported in g/m².

Melting Temperature (also referred to as the melting point) of a polymer as reported herein is measured by differential scanning calorimetry (DSC) according to ASTM D3418-99, which is hereby incorporated by reference, and is reported as the peak on the DSC curve in degrees Centigrade. The melting point was measured using polymer pellets and a heating rate of 10° C. per minute.

Shore D Hardness is a measure of rubber hardness and is measured according to ASTM D 2240, which is hereby incorporated by reference.

Thickness of the nonwoven materials is measured by TAPPI-T411 om-97, which is hereby incorporated by reference.

Elmendorf Tear is a measure of the force required to propagate an initiated tear from a cut or a nick. Elmendorf Tear is measured according to ASTM D1424, which is hereby incorporated by reference, in both the machine direction (MD) and the cross direction (XD) and is reported in units of lb or N.

Strip Tensile Strength is a measure of the breaking strength of a sheet and was measured according to ASTM D5035, which is hereby incorporated by reference, and is reported in units of lb or N. Five measurements were made and averaged in both the machine direction and the cross-direction.

Frazier Air Permeability is a measure of the air permeability of a sheet and was measured according to ASTM D 737, and reported in units of m³/min/m².

Mean Pore Size and Pore Size Distribution were measured by a capillary flow porometer model number CFP-34RTF8A-3-6-L4, available from Porous Materials, Inc. (Ithaca, N.Y.), following test method ASTM E1294.

Trap Tear Strength is a measure of the force required to propagate an initiated tear, and was measured according to ASTM D5733-90.

Grab Tensile Strength is a measure of breaking strength of a sheet and was measured by ASTM D5034-90.

EXAMPLES

The following examples demonstrate the preparation of smooth-calendered spunbond sheets useful as layers in casting substrates for use in composite membranes.

Examples 1-7

This example demonstrates the preparation of a smooth-calendered spunbond sheet made by calendering a spunbond nonwoven fabric containing sheath-core fibers. These layers would be suitable as bottom layers in SS structures according to the invention.

The spunbond nonwoven fabric was prepared in a bicomponent spunbond process using copolyester with a melting point of about 215° C. and an intrinsic viscosity of 0.65 as the sheath component, and poly(ethylene terephthalate) (PET) with a melting point of about 260° C. as the core component. The copolyester and PET resins were dried and crystallized prior to use.

The PET and the copolyester were heated and extruded in separate extruders, filtered and metered to a bicomponent spin block designed to provide a sheath-core filament cross section. The polymers were metered to provide fibers that were 30% copolyester (sheath) and 70% PET (core), based on fiber weight. The filaments were cooled in a quenching zone with quenching air provided from two opposing quench boxes. The filaments then passed into a pneumatic draw jet where the filaments were drawn and then deposited onto a moving collection or laydown belt, assisted by vacuum suction. The speed of the laydown belt was adjusted to give a final web having the desired basis weight of about 2 oz/yd² (68 g/m²) or about 3 oz/yd² (102 g/m²). The resulting spunbond nonwoven was lightly point bonded for transport prior to winding on a roll.

The lightly point bonded fabric was heavily calendered in a subsequent step. Calendering conditions for each sample are provided in Table 1. Temperature refers to the face temperature of the roll, as measured by a surface thermocouple pyrometer. In the case of a metal/metal nip, both rolls were heated, while in the cases of the metal/composite nip, only the metal roll was heated. When the fabric was calendered in 2 passes, the same calendering conditions were used for both passes, and the fabric was wound onto a core after the first pass. For the second pass, this fabric was then oriented such that the face that had been against the composite roll in the first pass, was against the metal roll in the second pass, or that had been against the upper metal roll in the first pass, was against the bottom metal roll in the second pass.

TABLE 1

| Ex. No. | Roll Temp. ° F. (° C.) | Pressure lb/in (N/cm) | Speed ft/min (m/min) | No. of Passes | Nip Material | Path |
|---|---|---|---|---|---|---|
| 1 | 329 (165) | 600 (6780) | 30 (9) | 1 | Metal/composite | Straight |
| 2 | 329 (165) | 200 (2260) | 30 (9) | 2 | Metal/metal | S-wrap |
| 3 | 349 (176) | 600 (6780) | 80 (24) | 2 | Metal/composite | S-wrap |
| 4 | 329 (165) | 600 (6780) | 80 (24) | 1 | Metal/composite | S-wrap |
| 5 | 346 (174) | 600 (6780) | 30 (9) | 1 | Metal/composite | Straight |
| 6 | 348 (175) | 200 (2260) | 30 (9) | 2 | Metal/composite | S-wrap |

TABLE 1-continued

| | | | | | | | |
|---|---|---|---|---|---|---|---|
| 7 | 349 (176) | 600 (6780) | 30 (9) | 2 | Metal/composite | S-wrap | |

| Ex. No. | Basis Wt. oz/yd² (g/m²) | Thickness mil (mm) | Frazier Air Perm. CFM/ft² (m³/min/m²) | Min pore size μm | Mean Flow pore size μm | Max pore size μm | MD Grab Tensile Strength lb (N) | CD Grab Tensile Strength lb (N) | MD Trap Tear Strength lb (N) | CD Trap Tear Strength lb (N) |
|---|---|---|---|---|---|---|---|---|---|---|
| 1 | 2.21 (74.9) | 5.64 (0.143) | 7.08 (2.16) | 2.37 | 9.34 | 28.2 | 87.5 (389) | 68.0 (302) | 1.66 (7.38) | 2.42 (10.8) |
| 2 | 2.18 (73.9) | 3.84 (0.0975) | 21.4 (6.54) | 5.19 | 12.2 | 36.1 | 136 (605) | 91.6 (407) | 1.71 (7.61) | 2.57 (11.4) |
| 3 | 2.18 (73.9) | 4.88 (0.124) | 18.7 (5.69) | 6.08 | 14.2 | 45.4 | 97.0 (461) | 67.1 (298) | 0.93 (4.14) | 1.66 (7.38) |
| 4 | 3.23 (109) | 7.24 (0.184) | 5.86 (1.79) | 2.35 | 8.86 | 25.3 | 155 (686) | 116 (516) | 2.44 (10.8) | 3.89 (17.3) |
| 5 | 3.24 (110) | 7.96 (0.202) | 4.97 (1.51) | 0.933 | 9.12 | 20.0 | 148 (659) | 118 (525) | 1.66 (7.38) | 2.74 (12.2) |
| 6 | 3.29 (111) | 7.6 (0.193) | 21.5 (6.56) | 3.59 | 9.33 | 26.1 | 137 (612) | 103 (456) | 2.17 (9.65) | 3.54 (15.7) |
| 7 | 3.23 (109) | 6.72 (0.171) | 9.02 (2.75) | 2.26 | 8.09 | 22.3 | 139 (621) | 99.4 (442) | 2.01 (8.94) | 2.77 (12.3) |

Examples 8-13

This example demonstrates the preparation of a smooth-calendered sheet by calendering a sheath-core spunbond nonwoven fabric containing bicomponent fibers containing linear low density polyethylene and PET, the nonwoven fabric having a pore size gradient through the thickness thereof. This gradient was created by forming a spunbond nonwoven fabric from two in-line, bicomponent spin blocks. By choosing different sheath/core ratios for the first and second spin beams, a pore size gradient was created in the fabric after calendering.

The sheath-core spunbond fabric was prepared in a bicomponent spunbond process using linear low density polyethylene (LLDPE) with a melting point of about 126° C. as the sheath component, and PET with a melting point of about 260° C. as the core component. The PET resin was crystallized and dried before use.

The PET and LLDPE polymers were heated and extruded in separate extruders, filtered and metered to a first bicomponent spin block designed to provide a sheath-core filament cross section. The polymers were metered to provide fibers of the desired sheath core ratio, based on weight of each component. The filaments were cooled in a quenching zone with quenching air provided from two opposing quench boxes. The filaments then passed into a pneumatic draw jet where the filaments were drawn and then deposited onto a laydown belt assisted by vacuum suction. The unconsolidated fiber web from the first bicomponent spin block was then passed under a second bicomponent spin block, in line with the first bicomponent spin block, designed to provide a sheath-core filament cross section. The polymers were metered to provide fibers the desired sheath core ratio from the second spin block, based on weight of each component. The filaments were cooled in a quenching zone with quenching air provided from two opposing quench boxes. The filaments then passed into a pneumatic draw jet where the filaments were drawn and then deposited onto the web from the first spin block, assisted by vacuum suction. The resulting spunbond web, containing the filaments from both the first and second spin blocks, had a basis weight of about 2.5 oz/yd² (85 g/m²), and was lightly point bonded for transport prior to winding on a roll.

These webs were then heavily calendered in a second step. The rolls were calendered in a single pass, straight through, with a metal on composite nip configuration. The composite roll was nylon, with hardness of 78 Shore D. Calendering conditions are given in Table 2.

TABLE 2

| Ex. No. | Sheath/Core Ratio, Spin Beam 1 % | Sheath/Core Ratio, Spin Beam 2 % | Metal Roll Face Temperature °F. (°C.) | Pressure lb/in (N/cm) | Speed ft/min (m/min) |
|---|---|---|---|---|---|
| 8 | 50/50 | 50/50 | 245 (118) | 100 (1130) | 30 (9.14) |
| 9 | 50/50 | 50/50 | 245 (118) | 1000 (11,300) | 30 (9.14) |
| 10 | 30/70 | 30/70 | 245 (118) | 100 (1130) | 30 (9.14) |
| 11 | 30/70 | 30/70 | 245 (118) | 1000 (11,300) | 30 (9.14) |
| 12 | 50/50 | 30/70 | 245 (118) | 100 (1130) | 30 (9.14) |
| 13 | 50/50 | 30/70 | 245 (118) | 1000 (11,300) | 30 (9.14) |

| Ex. No. | Basis Wt. oz/yd² (g/m²) | Thickness mil (mm) | Frazier CFM/ft² (m³/min/m²) | Min pore size μm | Mean Flow pore size μm | Max pore size μm | MD Grab Tensile Strength lb (N) | CD Grab Tensile Strength lb (N) | MD Trap Tear Strength lb (N) | CD Trap Tear Strength lb (N) |
|---|---|---|---|---|---|---|---|---|---|---|
| 8 | 2.41 (81.80) | 5.3 (0.135) | 0.71 (0.22) | 0.301 | 8.55 | 40.9 | 57.4 (255) | 33.6 (149) | 18.5 (82.1) | 32.7 (145) |

TABLE 2-continued

| | | | | | | | | | |
|---|---|---|---|---|---|---|---|---|---|
| 9 | 2.43 (82.5) | 5.1 (0.130) | 0.87 (0.27) | 0.786 | 4.46 | 32.6 | 58.1 (258) | 32.7 (145) | 13.8 (61.1) | 32.7 (145) |
| 10 | 2.61 (88.6) | 5.1 (0.130) | 4.77 (1.45) | 0.310 | 4.44 | 26.3 | 52.8 (235) | 29.5 (131) | 14.8 (65.5) | 32.4 (144) |
| 11 | 2.71 (92.0) | 5.4 (0.137) | 1.01 (0.31) | 0.198 | 3.91 | 19.3 | 61.7 (274) | 30.5 (136) | 13.8 (61.1) | 34.8 (154) |
| 12 | 2.52 (85.5) | 5.6 (0.142) | 17.4 (5.31) | 0.33 | 8.50 | 47.6 | 67.3 (299) | 41.0 (182) | 14.5 (64.5) | 33.1 (147) |
| 13 | 2.53 (85.9) | 5.4 (0.137) | 0.62 (0.19) | 0.29 | 3.55 | 17.2 | 70.9 (315) | 39.5 (175) | 15.5 (68.9) | 39.2 (174) |

The pore size distribution, as measured by the difference between the minimum and maximum pore sizes was about 35 μm for the top layer and about 20 μm for the bottom layer.

Examples 14-15

These examples demonstrate the preparation of smooth-calendered SMS sheets having copolyester-PET sheath-core fibers in the spunbond layers.

The spunbond layers used in these examples were prepared according to Examples 1-7 except that the basis weight of the top and bottom spunbond layers was 1.25 oz/yd² (42.4 g/m²) and 1.0 oz/yd² (33.9 g/m²), respectively, the weight percentage of the PET portion (core) and the coPET portion (sheath) was 50% each, and the intrinsic viscosity of the PET homopolymer was 0.64.

The meltblown layer used in these examples was formed using a side-by-side bicomponent meltblown process having side-by-side extruders. In these examples, an intimate polymer blend of 50% by weight of a copolyester with a melting point of about 215° C. and 50% by weight of PET with a melting point of about 260° C. was formed and the blend fed to each extruder. Both resins were crystallized prior to use. The melt viscosity of both polymers was adjusted during the spinning process via moisturization of the PET pellets. From each extruder, the blend was extruded, filtered and metered to a bicomponent spin block designed to provide a side-by-side meltblown filament cross-sections. The blend was metered from each extruder to the spin block such that the resulting side-by-side fiber was 50% by weight from each extruder. The filaments emerged from the spin pack into a high pressure, high temperature air stream. Below the spin pack quench air was directed at the filaments from two opposing quench boxes. The filaments were then deposited onto a laydown belt assisted by vacuum suction. The speed of the laydown belt was adjusted to give the desired basis weight of the final meltblown web. The resulting meltblown web had a basis weight of about 0.5 oz/yd² (17 g/m²) and was wound onto a roll without further bonding.

The composite structures were assembled in a second step, using the bonding set-up described in Examples 1-7. Bonding conditions used on these samples are given in Table 3.

The spunbond layers used in Examples 14 and 15 were bonded without the meltblown layer using the bonding conditions listed in Table 3. The resultant spunbond-spunbond (SS) structures were found to have the mean pore sizes listed in Table 3. The mean pore sizes of the SS structures can be used to approximate the mean pore sizes of the individual S layers as the mean pore size measurements of the SS structures would be close to the mean pore size measurements of the S layers. This mean pore size approximation can be contrasted with the mean pore size measurements of the SMS structures of Examples 14 and 15 to illustrate the pore size gradient within the SMS structures.

TABLE 3

| Example No. | Roll Face Temperature °F. (°C.) | Pressure lb/in (N/cm) | Speed ft/min (m/min) | Passes |
|---|---|---|---|---|
| 14 | 310 (154) | 200 (2260) | 30 (9.14) | 1 |
| 15 | 310 (154) | 200 (2260) | 30 (9.14) | 2 |

| Example No. | Basis Wt. oz/yd² (g/m²) | Thickness mil (mm) | Min pore size μm | Mean Flow pore size μm | Max pore size μm | MD Grab Tensile Strength lb (N) | CD Grab Tensile Strength lb (N) | MD Trap Tear Strength lb (N) | CD Trap Tear Strength lb (N) |
|---|---|---|---|---|---|---|---|---|---|
| 14 | 2.84 (96.3) | 8.20 (0.208) | 0.81 | 5.13 | 13.1 | | | | |
| 15 | 2.84 (96.3) | 6.07 (0.154) | 1.19 | 5.13 | 11.6 | 44.8 (199) | 33.1 (147) | 0.90 (4.00) | 1.70 (7.56) |
| SS only | | | 6.95 | 23.6 | 69.4 | | | | |
| SS only | | | 5.13 | 16.6 | 48.9 | | | | |

Examples 16-17

These examples demonstrate the preparation of smooth-calendered SMS sheets having copolyester-PET sheath-core fibers in the spunbond layers.

The spunbond layers used in these examples were prepared according to the previous examples, with the basis weight of the top and bottom spunbond layers being 1.25 oz/yd² (42.4 g/m²) and 1.0 oz/yd² (33.9 g/m²), respectively, except that in these examples, the 1.0 oz/yd² (33.9 g/m²) bicomponent spunbond used as the bottom spunbond layer had a sheath/core ratio of 30/70 (coPET sheath, PET core). As in the previous examples, the 1.25 oz/yd² (42.4 g/m²) bicomponent spunbond used as the top spunbond layer had a sheath/core ratio of 50/50 coPET sheath, PET core).

The meltblown layer used in these examples was formed using a bicomponent meltblown process using as the two components a copolyester with a melting point of about 215° C. and PET with a melting point of about 260° C. Both resins were crystallized prior to use. The PET and the copolyester were heated in separate extruders and were extruded, filtered and metered to a bicomponent spin block designed to provide fibers having side-by-side meltblown filament cross-sections. The polymers were metered to provide fibers that were 50% copolyester and 50% PET, based on fiber weight. The filaments emerged from the spin pack into a high pressure, high temperature air stream. Below the spin pack, quench air was directed at the filaments from two opposing quench boxes. The filaments were then deposited onto a laydown belt assisted by vacuum suction. The speed of the laydown belt was adjusted to give the desired basis weight of the final meltblown web. The resulting meltblown web had a basis weight of about 0.5 oz/yd$^2$ (17 g/m$^2$) and was wound onto a roll without further bonding.

The composite structure was assembled in a second step, using the bonding set-up described in Examples 1-7. Bonding conditions used on these samples are given in Table 4.

The spunbond layers used in Examples 16-17 (described in Examples 14-15) were bonded without the meltblown layer using the bonding conditions listed in Table 4. The resultant spunbond-spunbond (SS) structures were found to have the mean pore sizes listed in Table 4. The mean pore sizes of the SS structures can be used to approximate the mean pore sizes of the individual S layers, and can be contrasted with the mean pore size measurements of the SMS structures of Examples 16 and 17 to illustrate the pore size gradient within the SMS structures.

The mean pore size for the meltblown layer was about 5 μm, with a difference between the minimum and maximum pore sizes of about 11 μm. Mean pore size for the top spunbond layer was about 15 μm, with a difference between the minimum and maximum pore sizes of about 50 μm. The gradient between the top layer and the barrier layer was about 10 μm, i.e., the difference between the mean pore sizes of the top layer and the barrier layer.

Example 18

This example describes the preparation of a smooth-calendered SMS sheet having LLDPE-PET sheath-core fibers in the spunbond layers and LLDPE-PET side-by-side fibers in the meltblown layer.

A side-by-side meltblown web is prepared in a bicomponent meltblown process using as the two components LLDPE with a melting point of about 126° C. and PET with a melting point of about 260° C. The PET resin is crystallized prior to use. Melt viscosity of the PET is adjusted during the spinning process via moisturization of the PET pellets to achieve the desired intrinsic viscosity of the meltblown fibers.

The PET and the polyethylene are heated in separate extruders and extruded, filtered and metered to a bicomponent spin block designed to provide a side-by-side meltblown filament cross-sections. The polymers are metered to provide fibers of 30% polyethylene and 70% PET, based on fiber weight. The filaments are extruded into a high pressure, high temperature air stream. Below the spin pack quench air are directed from two opposing quench boxes. The filaments are then deposited onto a laydown belt assisted by vacuum suction. The resulting meltblown web is wound onto a roll without further bonding. The resulting meltblown web has a basis weight of about 0.6 oz/yd$^2$ (20.4 g/m$^2$) and a mean pore size between about 1 μm and about 20 μm.

The bicomponent sheath-core spunbond layers is prepared as described in previous Examples 8-13 using LLDPE as the sheath component and PET as the core component. The PET resin is crystallized and dried before use.

The polymers are metered by a bicomponent spin block designed to provide fibers with a sheath/core ratio of 50/50. The speed of laydown belt is adjusted to give a final web having a basis weight of 0.6 oz/yd$^2$ (20.4 g/m$^2$).

The composite structures are assembled in a second step, using the bonding set-up described in Examples 1-7. The samples are bonded using a metal-composite nip having a

TABLE 4

| Example No. | Roll Face Temperature ° F. (° C.) | Pressure lb/in (N/cm) | Speed ft/min (m/min) | Passes |
|---|---|---|---|---|
| 16 | 300 (149) | 200 (2260) | 30 (9.14) | 1 |
| 17 | 300 (149) | 200 (2260) | 30 (9.14) | 2 |

| Example No. | Basis Weight oz/yd$^2$ (g/m$^2$) | Thickness mil (mm) | Frazier Air Perm. CFM/ft$^2$ (m$^3$/min/m$^2$) | Min pore size μm | Mean Flow pore size μm | Max pore size μm | MD Grab Tensile Strength lb (N) | CD Grab Tensile Strength lb (N) | MD Trap Tear Strength lb (N) | CD Trap Tear Strength lb (N) |
|---|---|---|---|---|---|---|---|---|---|---|
| 16 | 3.10 (105) | 7.78 (0.198) | 0.80 (0.24) | 0.245 | 4.61 | 11.1 | 80.8 (359) | 45.0 (200) | 2.43 (10.8) | 2.70 (12.0) |
| 17 | 3.00 (102) | 6.85 (0.174) | 0.45 (0.14) | 0.283 | 4.30 | 10.8 | 69.5 (309) | 47.3 (210) | 1.60 (7.12) | |
| SS only | | | | 0.894 | 14.4 | 55.4 | | | | |
| SS only | | | | 1.51 | 15.5 | 50.6 | | | | |

121° C. roll face temperature and a 300 lb/in (53 kg/cm) nip pressure, at a 30 ft/min (9.1 m/min) line speed.

Examples 19-20

These examples demonstrate the preparation of smooth-calendered spunbond sheets which were made by calendering two separate spunbond nonwoven fabrics containing sheath-core fibers such that the spunbond fabrics were laminated together.

The individual spunbond nonwoven fabrics were prepared in a bicomponent spunbond process using copolyester with a melting point of about 215° C. and an intrinsic viscosity of 0.65 as the sheath component, and poly(ethylene terephthalate) (PET) with a melting point of about 260° C. as the core component. The copolyester and PET resins were dried and crystallized prior to use. For layers A and B, the polyester resin had an intrinsic viscosity of about 0.64, while for layer C, the polyester resin had an intrinsic viscosity of about 0.61.

To make each layer, the PET and the copolyester were heated and extruded in separate extruders, filtered and metered to a bicomponent spin block designed to provide a sheath-core filament cross section. The polymers were metered to provide fibers of the desired copolyester (sheath) and PET (core) ratio, based on fiber weight. The filaments were cooled in a quenching zone with quenching air provided from two opposing quench boxes. The filaments then passed into a pneumatic draw jet where the filaments were drawn and then deposited onto a moving collection or laydown belt, assisted by vacuum suction. The speed of the laydown belt was adjusted to give a final web having the desired basis weight. The resulting spunbond nonwoven was lightly point bonded for transport prior to winding on a roll.

The lightly point bonded fabrics were heavily calendered together in a subsequent step. Calendering conditions for each sample are provided in Table 5. Temperature refers to the face temperature of the roll, as measured by a surface thermocouple pyrometer. The fabric samples were calendered in a straight pass, using metal and composite nip rolls, in the first pass. For the second pass, the same calendering conditions were used as for the first pass. The fabric was wound onto a core after the first pass. For the second pass, this fabric was then oriented such that the face that had been against the composite roll in the first pass, was against the metal roll in the second pass.

TABLE 5

| Layer | Sheath/core ratio | Nominal Basis Wt. oz/yd² (g/m²) |
|---|---|---|
| A | 50% coPET/50% PET | 1.25 (42.4) |
| B | 30% coPET/70% PET | 1.25 (42.4) |
| C | 30% coPET/70% PET | 1.5 (50.9) |

| Example No. | Layers | Roll Face Temperature ° F. (° C.) | Pressure lb/in (N/cm) | Speed ft/min (m/min) | Passes |
|---|---|---|---|---|---|
| 19 | A + B | 360 (182) | 800 (9040) | 40 (12.2) | 2 |
| 20 | B + C | 360 (182) | 800 (9040) | 40 (12.2) | 2 |
|  | A only | 360 (182) | 800 (9040) | 40 (12.2) | 2 |

| Example No. | Basis Weight oz/yd² (g/m²) | Thickness mil (mm) | Frazier Air Perm. CFM/ft² (m³/min/m²) | Min pore size μm | Mean Flow pore size μm | Max pore size μm | MD Grab Tensile Strength lb (N) | CD Grab Tensile Strength lb (N) | MD Trap Tear Strength lb (N) | CD Trap Tear Strength lb (N) |
|---|---|---|---|---|---|---|---|---|---|---|
| 19 | 2.71 (92.0) | 6.3 (0.160) | 15.7 (4.80) | 0.67 | 10.0 | 52.5 | 82.4 (366) | 45.4 (202) | 5.80 (25.8) | 8.74 (38.8) |
| 20 | 2.94 (99.8) | 6.6 (0.168) | 5.40 (1.67) | 0.64 | 10.04 | 39.1 | 102 (452) | 66.6 (296) | 2.67 (11.9) | 3.39 (15.1) |
| Layer A |  |  |  | 1.25 | 26.40 | 129 |  |  |  |  |

Examples 21A and 21B

This example demonstrates the preparation of casting substrates suitable for use in a composite membrane for ultrafiltration and microfiltration. An SMS polypropylene fabric having a polypropylene meltblown layer sandwiched between two polypropylene spunbond layers (commercially available from Atex, Mi, Italy and having a nominal basis weight of about 70 g/m²) was lightly point bonded and subsequently smooth calendered at two sets of bonding conditions as listed in Table 6.

Examples 22A and 22B

This example demonstrates the preparation of casting substrates suitable for use in a composite membrane for ultrafiltration and microfiltration. An SMS polypropylene fabric having a polypropylene meltblown layer sandwiched between two polypropylene spunbond layers (commercially available from Atex, Mi, Italy and having a nominal basis weight of about 102 g/m²) was lightly point bonded and subsequently smooth calendered at two sets of bonding conditions as listed in Table 6.

TABLE 6

| | Bonding conditions | | | | | | | |
|---|---|---|---|---|---|---|---|---|
| | Temp. °C. | Roll Pressure lb/in (N/cm) | Line Speed ft/min (m/min) | Basis Weight g/m² | Thickness mils (mm) | Min pore size μm | Mean pore size μm | Max pore size μm |
| SMS feedstock for bonding (nominal basis wt. of 70 g/m²) | | | | | 10.20 (0.259) | 2.64 | 41.1 | 69.3 |
| SMS feedstock for bonding (nominal basis wt. of 102 g/m²) | | | | | 14.52 (0.369) | 0.95 | 8.04 | 16.93 |
| Example 21A | 110 | 1330 (2330) | 125 (38) | 71.44 | 3.22 (0.082) | 1.2 | 13.5 | 38.53 |
| Example 21B | 130 | 443 (775) | 125 (38) | 71.10 | 3.33 (0.085) | 0.51 | 5.43 | 16.44 |
| Example 22A | 110 | 1330 (2330) | 125 (38) | 101.73 | 5.57 (0.141) | 0.27 | 4.31 | 12.36 |
| Example 22B | 130 | 443 (775) | 125 (38) | 102.86 | 6.05 (0.154) | 0.23 | 4.69 | 12.95 |

Example 23

This example demonstrates the casting of a polysulfone solution onto a multilayer coPET/PET SMS substrate comprising spunbond, meltblown and spunbond layers. This multilayer coPET/PET SMS substrate was made by the method described for Examples 16-17, except that the meltblown layer was made by feeding 100% polyester to both extruders. The spunbond layers for this example were also as described in Examples 16-17. The spunbond and meltblown layers were combined together to create the composite structure in a separate bonding step, as described in Examples 16-17. The bonding conditions are given in Table 7. Physical properties of this substrate are also given in Table 7. The mean pore size data from the SS only layers from Table 4 can be used to approximate the pore size of the upper S layer used in Example 23, illustrating the pore size gradient within the SMS structure.

The casting solution was a 20 wt % polysulfone P-3500 commercially available from Solvay in 1-Methyl-2-pyrrolidinone (NMP). The viscosity of this casting solution was 30,000 cp (as measured by a Brookfield LVTD rotational viscometer using a #2 spindle at 0.6 rpm) for 30% solids and 2,230 cp for 20% solids. The solution was cast by hand using a square 4 mils doctor knife to distribute the solution across the surface of the substrate samples. The substrate cast with the solution was submerged in demineralized water 15 seconds after casting for to remove the solvent from the cast layer of solution. The thickness of the resulting polysulfone layer was 1.5 mils. The solidified polysulfone interlocked with the surface of the spunbond layer onto which it was cast. No strikethrough of the casting solution was observed.

TABLE 7

| Example No. | Roll Face Temperature °F. (°C.) | Pressure lb/in (N/cm) | Speed ft/min (m/min) | Passes |
|---|---|---|---|---|
| 23 | 300 (149) | 200 (2260) | 30 (9.14) | 1 |

| Example No. | Basis Weight oz/yd² (g/m²) | Thickness mil (mm) | Frazier Air Perm. CFM/ft² (m³/min/m²) | Min pore size μm | Mean Flow pore size μm | Max pore size μm | MD Grab Tensile Strength lb (N) | MD Trap Tear Strength lb (N) | CD Trap Tear Strength lb (N) |
|---|---|---|---|---|---|---|---|---|---|
| 23 | 2.86 (97.1) | 4.4 (0.112) | 2.06 (0.79) | 0.8 | 4.8 | 14.7 | 71.90 (319) | 2.53 (11.2) | 0.82 (3.64) |

We claim:

1. A casting substrate in combination with a casting of a microporous membrane thereon and supporting the microporous membrane in a composite membrane, the casting substrate having a casting surface comprising a porous spun bond layer having a casting surface substantially free of raised fibers and loops and a bottom surface and having a pore size gradient through the thickness thereof, wherein the casting surface has a mean pore size of between about 15 μm and about 200 μm and the bottom surface has a mean pore size of between about 1 μm and about 20 μm and the microporous membrane is cast onto the casting surface that has a mean pore size of between about 15 μm and about 200 μm.

2. The casting substrate of claim 1 wherein the spunbond layer comprises bicomponent sheath-core fibers in which the polymer component in the sheath has a lower melting temperature than the polymer component in the core.

3. The casting substrate of claim 2 wherein the sheath component is a copolyester and the core component is polyethylene terephthalate.

4. The casting substrate of claim 2 wherein the sheath component is polyethylene and the core component is polyethylene terephthalate.

5. A casting substrate in combination with a casting of a microporous membrane thereon and supporting the microporous membrane in a composite membrane, the casting substrate having a casting surface substantially free of raised fibers and loops comprising a first porous spunbond layer having a casting surface laminated to a second porous spunbond layer, wherein the mean pore size of the first porous spunbond layer is between about 10 μm and about 200 μm and the mean pore size of the second porous spunbond layer is between about 1 μm and about 20 μm and the microporous membrane is cast onto the casting surface of the first spunbond layer that has a mean pore size of between about 10 μm and about 200 μm.

6. The casting substrate of claim 5 wherein the first and second porous spunbond layers comprise different polymers.

7. The casting substrate of claim 5 wherein the first and second porous spunbond layers each comprise bicomponent sheath-core fibers in which the polymer component in the sheath has a lower melting temperature than the polymer component in the core.

8. The casting substrate of claim 7 wherein the sheath component is a copolyester and the core component is polyethylene terephthalate.

9. The casting substrate of claim 8 wherein the sheath component is polyethylene and the core component is polyethylene terephthalate.

10. The casting substrate of claim 5 further comprising a meltblown layer between the first and second porous spunbond layers, wherein the mean pore size of the meltblown layer is between about 1 μm and about 20 μm.

11. The casting substrate of claim 10 wherein the first and second porous spunbond layers each comprise bicomponent sheath-core fibers having a copolyester sheath and a polyethylene terephthalate core and wherein the meltblown layer comprises bicomponent fibers having copolyester and polyethylene terephthalate components of arranged side-by-side.

12. The casting substrate of claim 10 wherein the first and second porous spunbond layers each comprise bicomponent sheath-core fibers having a polyethylene sheath and a polyethylene terephthalate core and wherein the meltblown layer comprises bicomponent fibers having polyethylene and polyethylene terephthalate components of arranged side-by-side.

13. The casting substrate of any of claims 1, 5 or 10 wherein the spunbond layers comprise polypropylene or polyethylene fibers.

14. The casting substrate of any of claims 1, 5 or 10 wherein the spunbond layers comprise polyester fibers.

15. A composite membrane comprising a microporous membrane layer and a casting substrate according to claim 1 or 5, wherein the composite membrane is a liquid filtration medium.

16. A composite membrane comprising a microporous membrane layer and a casting substrate according to claim 1 or 5, wherein the composite membrane is a gas filtration medium.

17. A process for forming a composite membrane comprising a microporous membrane layer and a casting substrate, comprising the steps:
(a) providing a porous spunbond fabric comprising polymeric fibers having a casting surface and a bottom surface, wherein the fabric has a pore size gradient between the casting surface and the bottom surface; and
(b) casting a polymeric solution onto the casting surface of the spunbond fabric that has a mean pore size of between about 15 μm and about 200 μm to form the microporous membrane layer, wherein the bottom surface of the spunbond fabric has a mean pore size of between about 1 μm and about 20 μm.

18. The process of claim 17 further comprising between steps (a) and (b): calendering the porous spunbond fabric between smooth nip rolls under combined conditions of temperature, pressure and residence time that result primarily in inter-fiber bonding at fiber cross-over points by softening of the polymer, so that the casting surface of the spunbond fabric is substantially free of raised fibers and loops.

19. The process of claim 17 wherein the porous spunbond fabric comprises multiple layers of melt-spun polymeric fibers.

20. The process of claim 17 wherein the porous spunbond fabric comprises a laminate of a first porous spunbond fabric and a second porous spunbond fabric, wherein the first porous spunbond fabric comprises a casting surface having a mean pore size of between about 10 μm and about 200 μm, and the second porous spunbond fabric comprises a bottom surface having a mean pore size between about 1 μm and about 20 μm.

21. The process of claim 17 wherein the porous spunbond fabric comprises bicomponent fibers comprising a higher-melting polymeric core component and a lower-melting polymeric sheath component and wherein the porous spunbond fabric is calendered at combined conditions of temperature, pressure and line speed that result in inter-fiber bonding at fiber cross-over points by melting/softening of the lower melting polymeric component without significant flowing of the lower-melting component.

22. The process of claim 17 wherein the porous spunbond fabric is a multilayer fabric comprising a meltblown layer of fibers having a diameter between about 0.5 μm and about 10 μm sandwiched between two spunbond layers, and wherein the casting surface has a mean pore size between about 10 μm and about 200 μm and the meltblown layer has a mean pore size between about 1 μm and about 20 μm.

23. The process of claim 22 wherein the spunbond layers and the meltblown layer comprise bicomponent fibers comprising a higher-melting polymeric core component and a lower-melting polymeric sheath component, further comprising calendering the porous spunbond fabric at combined conditions of roll temperature, pressure and line speed that result in inter-fiber bonding at fiber cross-over points in the spunbond layer(s) by melting/softening of the lower melting polymeric component without significant flowing of the lower-melting component.

\* \* \* \* \*